United States Patent
Albl et al.

(10) Patent No.: US 10,336,178 B2
(45) Date of Patent: Jul. 2, 2019

(54) FINAL DRIVE FOR A MOTOR VEHICLE AND FINAL DRIVE DEVICE

(71) Applicant: AUDI AG, Ingolstadt (DE)

(72) Inventors: Sebastian Albl, Gaimersheim (DE);
Daniel Laurijssen, Ingolstadt (DE);
Dominik Mohrlock, Buxheim (DE);
Sandro Weigelt, Lenting (DE);
Christoph Schmutz, Demling (DE);
Patrik Frommann, Ingolstadt (DE);
Stefan Hübler, Garching (DE);
Stefanie Seide, Riedenburg (DE);
Albert Scharlach, Oberdolling (DE);
Jürgen Schmitz, Karlshuld (DE);
Michael Streicher, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 11 days.

(21) Appl. No.: 15/831,479

(22) Filed: Dec. 5, 2017

(65) Prior Publication Data
US 2018/0162215 A1    Jun. 14, 2018

(30) Foreign Application Priority Data

Dec. 8, 2016 (DE) .......................... 10 2016 224 474
Jul. 20, 2017 (DE) .......................... 10 2017 212 500

(51) Int. Cl.
*B60K 1/00* (2006.01)
*B60K 7/00* (2006.01)
(Continued)

(52) U.S. Cl.
CPC .............. *B60K 7/0007* (2013.01); *B60K 1/00* (2013.01); *B60K 17/16* (2013.01); *B60K 17/24* (2013.01);
(Continued)

(58) Field of Classification Search
CPC ........ B60K 7/0007; B60K 1/00; B60K 17/16; B60K 17/24; B60K 17/354; B60K 17/356;
(Continued)

(56) References Cited

U.S. PATENT DOCUMENTS

2011/0259657 A1    10/2011 Fuechtner
2012/0052995 A1    3/2012 Scarbo et al.
(Continued)

FOREIGN PATENT DOCUMENTS

DE        19713651 A1    10/1997
EP        3138718 A1 *    3/2017    ............. B60K 17/14
(Continued)

OTHER PUBLICATIONS

European Search Report, dated May 9, 2018, in corresponding European application No. 17197709.3; 8 pgs.

*Primary Examiner* — Paul N Dickson
*Assistant Examiner* — Hilary L Johns
(74) *Attorney, Agent, or Firm* — Maier & Maier, PLLC

(57) ABSTRACT

A final drive for a motor vehicle. A drive assembly having a drive shaft, the drive shaft is coupled via a gear stage to an output shaft of the final drive. The drive shaft is coupled to the gear stage via an intermediate shaft that is arranged offset with respect to it. The intermediate shaft is present on a first side of a conceptual plane that incorporates an axis of rotation of the drive shaft, and a power electronics unit is electrically connected to the drive assembly via connection terminals arranged at its front end on a second side of the plane, which lies opposite to the first side.

10 Claims, 2 Drawing Sheets

(51) Int. Cl.
  *B60K 17/16* (2006.01)
  *B60K 17/24* (2006.01)
  *B60K 17/356* (2006.01)
  *F16H 37/08* (2006.01)
  *F16H 48/08* (2006.01)
  *B60K 17/354* (2006.01)

(52) U.S. Cl.
  CPC .......... *B60K 17/354* (2013.01); *B60K 17/356* (2013.01); *F16H 37/0813* (2013.01); *F16H 37/0826* (2013.01); *F16H 48/08* (2013.01); *B60K 2001/001* (2013.01); *B60K 2007/0038* (2013.01); *B60K 2007/0069* (2013.01); *B60Y 2200/91* (2013.01)

(58) Field of Classification Search
  CPC ...... B60K 2001/001; B60K 2007/0038; B60K 2007/0069; F16H 37/0813; F16H 37/0826; F16H 48/08; B60Y 2200/91
  USPC ....................................................... 180/65.6
  See application file for complete search history.

(56) References Cited

U.S. PATENT DOCUMENTS

2016/0107914 A1    4/2016  Baker et al.
2016/0229289 A1*   8/2016  Frohnmayer .......... B60K 17/08

FOREIGN PATENT DOCUMENTS

EP        3138718 A1    3/2017
WO     2016150330 A1    9/2016

* cited by examiner

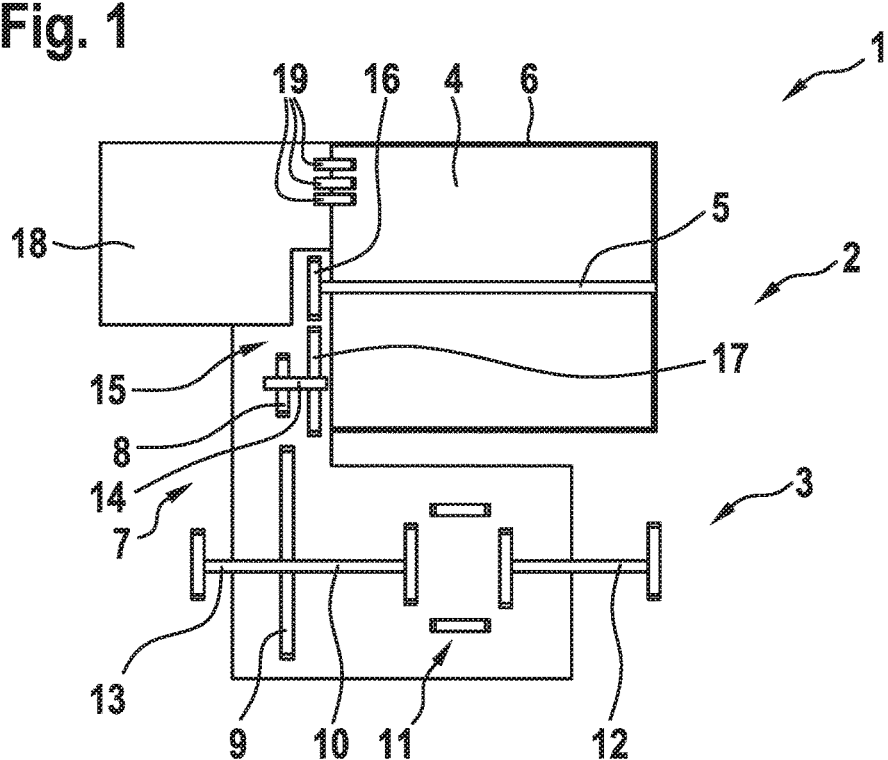
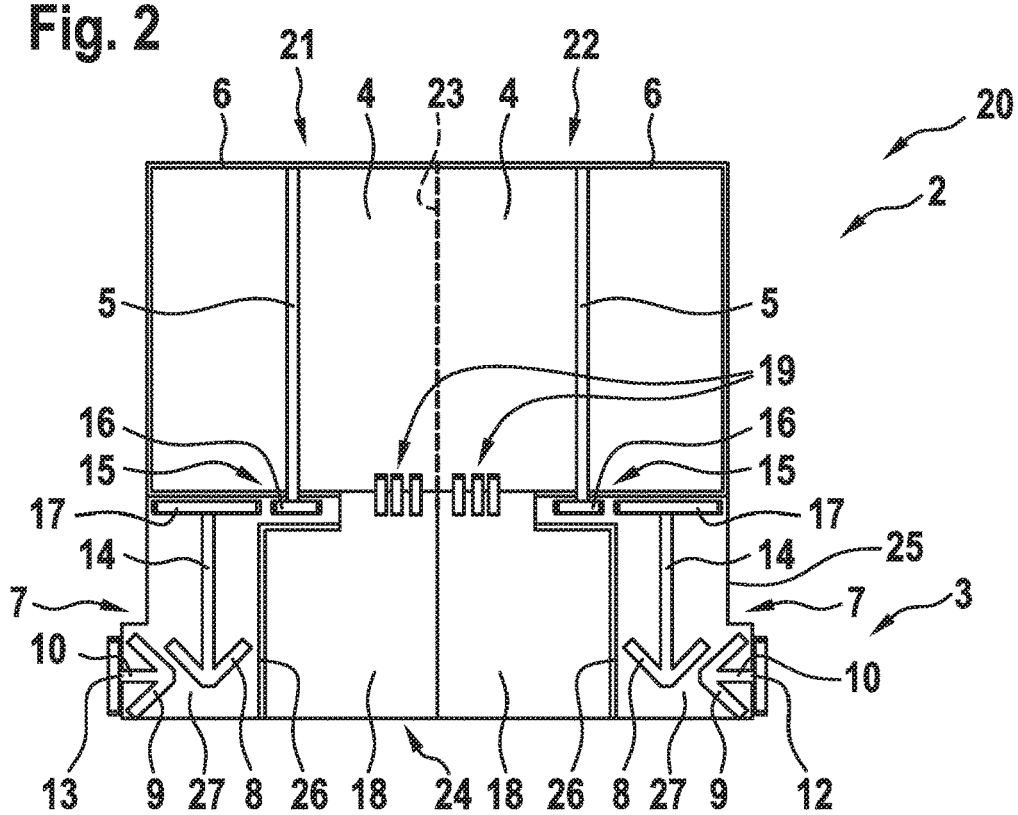

FINAL DRIVE FOR A MOTOR VEHICLE AND FINAL DRIVE DEVICE

FIELD

The invention relates to a final drive for a motor vehicle, comprising a drive assembly having a drive shaft, wherein the drive shaft is coupled to an output shaft of the final drive via a gear stage. The invention further relates to a final drive device.

BACKGROUND

The final drive can be used as a component of the motor vehicle; in particular, it forms a component of the final drive device. The final drive serves for driving at least one wheel of a wheel axle of the motor vehicle, preferably a plurality of wheels of the wheel axle. By use of the final drive, a torque directed at driving the motor vehicle is in this regard supplied or at least can be supplied. The final drive comprises the drive assembly, which, in turn, comprises the drive shaft. The drive assembly supplies a drive torque to the drive shaft. Consequently, the drive shaft can be present as a rotor shaft or can be referred to as such. Furthermore, the final drive has the output shaft, which can be coupled to or is coupled to the wheel axle or to the at least one wheel of the wheel axle, preferably rigidly and/or permanently.

The drive shaft is coupled to the output shaft via the gear stage. The gear stage can hereby be designed basically in any way, in particular depending on the alignment of the drive assembly or of its drive shaft with respect to the output shaft of the final drive. Thus, for example, the gear stage can be present as a spur gear stage or as a bevel gear stage. In the former case, the drive shaft is arranged essentially parallel to the output shaft; in the latter case, the drive shaft and the output shaft are at an angle with respect to each other or at least the output shaft is at an angle with respect to a conceptual plane incorporating the drive shaft.

SUMMARY

The object of the invention is to propose a final drive for a motor vehicle, which has advantages in comparison to known final drives and, in particular, has a compact construction and, in addition, can be used in a modular way.

This is achieved in accordance with the invention by means of a final drive. It is hereby provided that the drive shaft is coupled to the gear stage via an intermediate shaft arranged offset with respect to the drive shaft, wherein the intermediate shaft lies on a first side of a conceptual plane incorporating an axis of rotation of the drive shaft, and wherein a power electronics unit on a second side of the plane, which lies opposite to the first side, is electrically connected to the drive assembly via connection terminals arranged at the drive assembly at its front end.

The mechanical coupling of the drive shaft to the output shaft in this regard does not occur directly via the gear stage. Instead, the intermediate shaft is additionally provided in the operative connection. The coupling of the drive shaft to the gear stage hereby occurs via the intermediate shaft, so that, conversely, the intermediate shaft is coupled to the output shaft via the gear stage, in particular rigidly and/or permanently. The coupling of the drive shaft to the intermediate shaft can be designed basically in any way. For example, it exists via an intermediate-shaft gear stage, which, in analogy to the statements made for the gear stage, can be designed as a spur gear stage or as a bevel gear stage.

In any case, however, the intermediate shaft is arranged offset with respect to the drive shaft, so that their axes of rotation do not coincide. In the case of the design of the intermediate-shaft gear stage as a spur gear stage, it is possible to provide, for example, a parallel offset arrangement of the drive shaft and the intermediate shaft. In the case of the bevel gear stage, the drive shaft and the intermediate shaft are at an angle with respect to each other or are even arranged skewed with respect to each other.

Due to the offset arrangement of the intermediate shaft and the creation of the operative connection between the drive shaft and the output shaft via this intermediate shaft, additional installation space is created, which, in the case of the final drive presented here, is drawn on for the arrangement of the power electronics unit. The power electronics unit is preferably associated with the drive assembly and therefore serves for the operation thereof. For this purpose, for example, the drive assembly is designed as an electric motor, so that, correspondingly, the power electronics unit is electrically connected to the drive assembly.

The power electronics unit and the intermediate shaft are each arranged at least in part on opposite-lying sides of the conceptual plane, with the conceptual plane incorporating the axis of rotation of the drive shaft. Preferably, the intermediate shaft is arranged completely on the first side of the conceptual plane. The power electronics unit then lies, at least in part and preferably in large part or even completely, on the second side of the plane. However, it can be provided that a part of the power electronics unit protrudes from the second side onto the first side, so that the power electronics unit in this regard is intersected by the conceptual plane and/or the axis of rotation of the drive shaft.

The described design of the final drive makes possible an electrical connectivity of the power electronics unit to the drive assembly on the front end thereof. The front end is hereby understood to be, for example, a side of a motor housing of the drive assembly or of the electric motor. The motor housing is usually equipped with at least one bearing shield and, in particular, two bearing shields, which are present on opposite-lying sides of the drive assembly and are spaced apart. The two bearing shields are joined to each other via a housing casing, which can be at least largely cylindrical and, in particular, circular cylindrical.

The front end then lies on a side of the bearing shield or on a side of one of the bearing shields that faces away from the other respective bearing shield. Preferably, the drive shaft penetrates the front end and, in particular, the drive shaft protrudes over the front end. More preferably, the front end in this case is the front end of the drive assembly that faces the intermediate shaft.

The intermediate shaft can be arranged basically in any way. More preferably, however, it is arranged at the front end of the drive assembly, namely in such a way that it is arranged inside of a conceptual extension of the housing casing. It is therefore provided that the intermediate shaft does not protrude over the drive assembly or the motor housing in the radial direction with respect to the axis of rotation of the drive shaft. More preferably, this additionally applies to the intermediate-shaft gear stage, by way of which the drive shaft is coupled to the intermediate shaft. Therefore, the intermediate-shaft gear stage in this regard also lies at the front end with respect to the drive assembly, preferably completely at the front end and hence not protruding over the front end in the radial direction.

Such a design of the final drive makes possible a large number of configurations, so that the final drive is constructed in an extremely modular way. For example, the final drive can be associated as the sole drive of a wheel axle of the motor vehicle. In this case, the final drive serves preferably for driving a plurality of wheels of the wheel axle, with theses wheels being preferably present on opposite-lying sides of the motor vehicle or being associated with different tracks of the motor vehicle.

For example, it is provided in this case to couple the output shaft via a differential to at least one wheel of the wheel axle or to a plurality of wheels of the wheel axle. In particular, the output shaft is joined to an input shaft of the differential, whereas one of the wheels is joined to a first output shaft and a second wheel is joined to a second output shaft of the differential, preferably rigidly and/or permanently in each case. In such a design, the drive shaft is preferably arranged parallel or at least essentially parallel to the wheel axle.

Alternatively, it can be provided to employ the final drive for driving solely one wheel of the motor vehicle or of the wheel axle of the motor vehicle. In this case, it is possible to employ a plurality of final drives for a plurality of wheels of the wheel axle, with these final drives each being preferably designed in accordance with the statements made in the scope of this description. Preferably, a separate final drive is therefore associated with each wheel of the wheel axle. In such a design, the drive shafts of the final drive are preferably arranged parallel to a main direction of travel of the motor vehicle or at an angle with respect to the wheel axle. The plurality of final drives together form the final drive device already mentioned above.

It is hereby important, in particular, that the final drive is suitable in the same design, that is, with an identically constructed drive assembly, an identically constructed power electronics unit, as well as an identically constructed intermediate shaft and identically constructed intermediate-shaft gear stage, both for driving a plurality of wheels of the wheel axle and for driving only one wheel of the wheel axle. In the first case, the final drive is aligned with the drive shaft, which is arranged essentially parallel to the wheel axle, whereas, in the latter case, a plurality of final drives and, in particular, exactly two final drives having the same form of construction are arranged essentially along the main direction of travel. In the latter case, the two final drives are hereby arranged essentially in a mirror image to each other.

The invention further relates to a final drive device for a motor vehicle, comprising a first final drive and a second final drive, in particular each in accordance with the statements made above, comprising a first drive assembly of the first final drive, which has a first drive shaft, and a second drive assembly of the second final drive, which has a second drive shaft, wherein the first drive shaft is coupled via a first gear stage to a first output shaft of the final drive device and the second drive shaft is coupled via a second gear stage to a second output shaft of the final drive device.

It is hereby provided that the first drive assembly and the second drive assembly are arranged symmetrically with respect to a plane of symmetry running between them, wherein the first drive shaft is coupled to the first gear stage via a first intermediate shaft, which is at an angle with respect to it, skewed with respect to it, and/or offset with respect to it in the direction facing away from the plane of symmetry, and the second drive shaft is coupled to the second gear stage via a second intermediate shaft, which is at an angle with respect to it and is arranged offset with respect to it in the direction facing way from the plane of symmetry.

The final drive device has two final drives, namely preferably two final drives, each in accordance with the statements made above. The two drive assemblies are arranged symmetrically with respect to the plane of symmetry. The plane of symmetry preferably is parallel to the first drive shaft and/or to the second drive shaft or to the respective axis of rotation. Each final drive is then equipped with an intermediate shaft; that is, the first final drive has the first intermediate shaft and the second final drive has the second intermediate shaft.

The two intermediate shafts are arranged offset—for example, offset in parallel—with respect to the respective drive shaft in the direction facing away from the plane of symmetry. In each case, this can be accomplished in accordance with the statements made above by means of an intermediate-shaft gear stage. Owing to the offset arrangement of the intermediate shafts with respect to the drive shafts, in turn, installation space is created and is utilized preferably, albeit not necessarily, for the power electronics unit.

It can be provided that the first intermediate shaft is arranged offset in parallel with respect to the first drive shaft and/or the second intermediate shaft is arranged offset in parallel with respect to the second drive shaft. Reference hereto has already been made above. Alternatively, the first intermediate shaft can be at an angle with respect to the first drive shaft. This is understood to mean that the axes of rotation of the first intermediate shaft and the first drive shaft intersect, namely at an angle that is greater than 0° and less than 180°. It is also possible to create a skewed arrangement of the first intermediate shaft and the first drive shaft. A skewed arrangement is understood to mean a mutually spaced, non-parallel arrangement of the two shafts. They therefore do not intersect and are also not parallel to each other. The second intermediate shaft and the second drive shaft are arranged analogously.

Preferably, it is provided that the first intermediate shaft and the first drive shaft, on the one hand, and the second intermediate shaft and the second drive shaft, on the other hand, are arranged analogously with respect to each other. In the case of a parallel arrangement of the two first shafts, the two second shafts in this regard are also arranged parallel to each other. In the case of an angled arrangement of the first two shafts, the two second shafts are also arranged parallel to each other. In the case of a skewed arrangement of the two first shafts, the two second shafts are also arranged skewed with respect to each other.

Additionally or alternatively, it can be provided that, at the first output shaft, a first output flange is present for connection of the first output shaft to a first axle member of a wheel axle of the motor vehicle and/or, at the second output shaft, a second output flange is present for connection of the second output shaft to a second axle member of the wheel axle. The two output flanges in this regard serve for the linkage of the wheel axle or the respective axle member of the wheel axle at the final drive device. The output flanges are designed, for example, in such a way as to tolerate the existence of an angular offset between the output shaft and the respective axle member of the wheel axle connected to the output shaft. The axle members can be referred to alternatively, for example, as driven shafts.

Another preferred embodiment of the invention provides that the first gear stage and the second gear stage are each designed as a bevel gear stage, so that an axis of rotation of the first output shaft and an axis of rotation of the second output shaft are each at an angle with respect to the plane of symmetry, or that the first gear stage and the second gear stage are each designed as a spur gear stage. An angled arrangement is understood to mean that, in each case, an angle that is greater than 0° and less than or equal to 90° exists in each case between the axes of rotation of the two output shafts, that is, the first output shaft and the second output shaft, and the plane of symmetry.

Preferably, the axes of rotation are perpendicular on the plane of symmetry, so that, therefore, the angle is exactly 90° or at least approximately 90°. Such an alignment of the output shafts is achieved by the use of bevel gear stages as first gear stage and second gear stage.

The first gear stage and the second gear stage can be designed alternatively, however, as spur gear stages. This means that the first intermediate shaft and the first drive shaft are arranged parallel to each other and the second intermediate shaft and the second drive shaft are also arranged parallel to each other. In such a design, it is preferably provided that the already aforementioned first intermediate-shaft gear stage as well as the second intermediate-shaft gear stage are each preferably designed as a bevel gear stage, so that, in turn, the axis of rotation of the first output shaft and the axis of rotation of the second output shaft are each at the angle with respect to the plane of symmetry, that is, enclose with it the angle that is greater than 0° and less than or equal to 90°. Preferably, the first output shaft and the second output shaft in such an embodiment of the final drive device are perpendicular on the plane of symmetry or at least approximately perpendicular.

Another preferred embodiment of the invention provides that the first gear stage and the second gear stage are arranged in a common gear housing, at and/or in which the two output shafts are mounted. Whereas, obviously, it is possible to provide a separate gear housing for each of the two gear stages, wherein the corresponding output shaft can also be mounted at the respective gear housing, preferably the common gear housing is provided. The two gear stages are arranged, preferably completely, in the gear housing. The gear housing also serves for the mounting and/or the accommodation of at least portions of the two output shafts.

In the scope of another preferred embodiment of the invention, it is provided that the first drive shaft is coupled via a first intermediate-shaft gear stage to the first intermediate shaft and the second drive shaft is coupled via a second intermediate-shaft gear stage to the second intermediate shaft. Reference to such a design was already made above. The operative connection in this case exists between the drive shaft and the output shaft of the respective final drive via the intermediate-shaft gear stage, the intermediate shaft, and the gear stage. The respective drive shaft is hereby coupled to the intermediate shaft via the corresponding intermediate-shaft gear stage, namely preferably rigidly and/or permanently. The intermediate shaft, in turn, is coupled to the output shaft via the gear stage, preferably likewise rigidly and/or permanently. A rigid coupling of the intermediate-shaft gear stage to the gear stage is preferably created by way of the respective intermediate shaft.

For example, the first intermediate-shaft gear stage and the second intermediate-shaft gear stage are each designed as a spur gear stage or as a bevel gear stage. Therefore, either both intermediate-shaft gear stages are present as spur gear stages or both intermediate-shaft gear stages are present as bevel gear stages. The design as a spur gear stage is provided, in particular, if the first gear stage and the second gear stage are present in the form of bevel gear stages. Conversely, the design as bevel gear stages is provided if the two gear stages are designed as spur gear stages.

An enhancement of the invention provides that an intermediate-shaft gear wheel of the respective intermediate-shaft gear stage, which is connected to one of the intermediate shafts in a rotationally-resistant manner, is arranged at least in large part and, in particular completely, on one side of a conceptual plane that incorporates the axis of rotation of the respective drive shaft and is arranged parallel to the plane of symmetry. In other words, this means that more than half of the intermediate-shaft gear wheel is present on one side of the conceptual plane. More preferably, obviously, the entire intermediate-shaft gear wheel is present on the side of the plane. The latter is the case, in particular, when the intermediate-shaft gear wheel is designed as a bevel gear, which applies to the design of the intermediate gear stage as a bevel gear stage.

The side on which the intermediate-shaft gear wheel is present is, at least in large part, preferably the side of the conceptual plane facing away from the plane of symmetry. More preferably, the intermediate-shaft gear wheel is arranged at a spacing from the conceptual plane, namely on the side facing away from the plane of symmetry. Such an embodiment creates an especially large installation space, which is available for other purposes.

An enhancement of the invention provides that, between the first gear stage and the second gear stage, an accommodating compartment for a power electronics unit is formed for mounting a power electronics unit for the first drive assembly and/or the second drive assembly, wherein at least portions of the compartment for the power electronics unit are delimited by the first drive assembly and/or the second drive assembly. The power electronics unit serves, for example, for actuation of the first drive assembly and/or the second drive assembly. For example, the power electronics unit combines two power electronics unit members, wherein one of the partial power electronics unit members is associated with the first drive assembly and a second power electronics unit member is associated with the second drive assembly.

The power electronics unit is arranged in the power electronics unit compartment. The latter is present between the first gear stage and the second gear stage and is therefore preferably intersected by an axis of rotation of the first output shaft and by an axis of rotation of the second output shaft. The installation space for the power electronics unit extends all the way to the first drive assembly, all the way to the second drive assembly, or—preferably—all the way to both drive assemblies. This means that the mounting compartment for the power electronics unit partially overlaps with the drive shafts in the axial direction with respect to the axes of rotation of the drive shafts.

Another preferred embodiment of the invention provides that the mounting compartment for the power electronics unit is separated by means of a dividing wall from a first gearbox mounting compartment, in which the first gear stage and/or the first intermediate-shaft gear stage is (are) arranged, and/or from a second gearbox mounting compartment, in which the second gear stage and/or the second intermediate-shaft gear stage is (are) arranged. The final drive device is in this regard equipped with the first gearbox mounting compartment and the second gearbox mounting compartment, in each of which a gearbox or a gear stage is arranged. Thus, the first gear stage or the first intermediate-shaft gear stage is present in the first gearbox mounting compartment, for example, but preferably both are present there. Analogously, the second gear stage, the second intermediate-shaft gear stage, or—again preferably—both is (are) present in the second gearbox mounting compartment.

The dividing wall is then provided for separation of the mounting compartment for the power electronics unit from the first gearbox mounting compartment, from the second gearbox mounting compartment, or from both, with it obviously also being possible to provide a plurality of dividing walls. The mounting compartment for the power electronics unit overlaps at least in part, as viewed in the axial direction with respect to the axes of rotation of the drive shafts, preferably with the two gearbox mounting compartments, that is, with the first gearbox mounting compartment and the second gearbox mounting compartment.

A preferred embodiment of the invention provides that a power electronics unit arranged in the power electronics unit mounting compartment is electrically connected to the first drive assembly and/or to the second drive assembly via connection terminals arranged at the front ends thereof. The connectivity of the power electronics unit to the first drive assembly, to the second drive assembly, or to both is in this regard provided for at the front ends thereof. For this purpose, the drive assemblies have correspondingly arranged connection terminals, preferably plug connection terminals.

Finally, in the scope of another embodiment of the invention, it is provided that the first drive assembly is arranged in a first motor housing and the second drive assembly is arranged in a second motor housing, wherein the first motor housing and the second motor housing are arranged directly at the gear housing and/or that the first drive assembly and the second drive assembly are arranged in a common motor housing arranged directly at the gear housing. In the former case, separate motor housings for the first drive assembly and the second drive assembly, namely, the first motor housing and the second motor housing, are provided here. The two motor housings are arranged directly at the gear housing, preferably fastened rigidly to it. Obviously, it can also be provided that the two drive assemblies are present in a common motor housing that is arranged, in analogy to the above, directly at the gear housing or is fastened to it.

BRIEF DESCRIPTION OF THE FIGURES

The invention will be explained in detail below on the basis of the exemplary embodiments illustrated in the drawing, without any limitation of the invention thereby ensuing. Shown are:

FIG. 1 a schematic illustration of a final drive for a motor vehicle, which has a drive assembly as well as an output shaft, FIG. 2 a schematic illustration of a first embodiment of a final drive device for a motor vehicle, which has a plurality of final drives, and FIG. 3 a schematic illustration of a second embodiment of the final drive device.

DETAILED DESCRIPTION OF THE FIGURES

Figure 3:
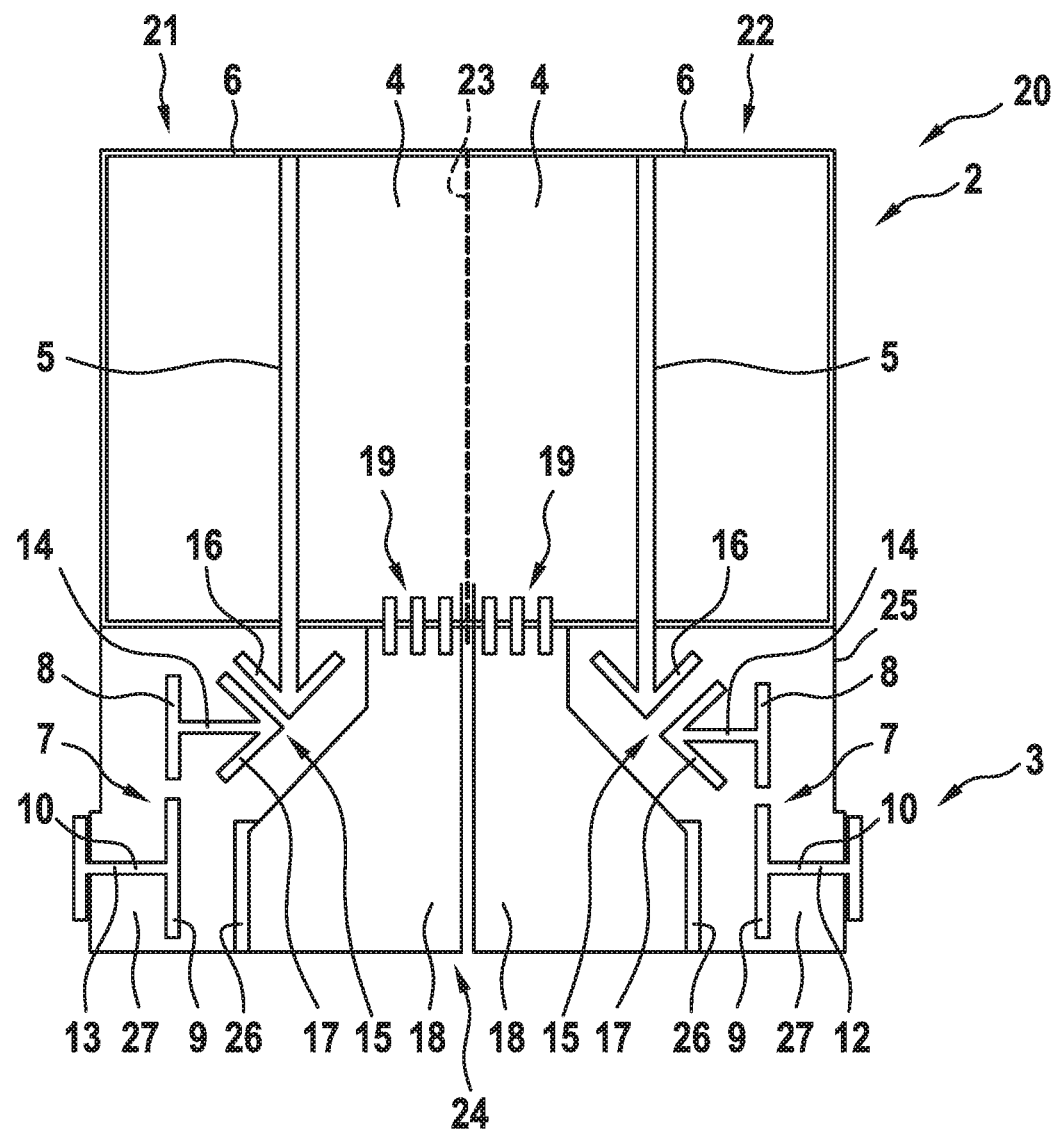

FIG. 1 shows a schematic illustration of a final drive 1 for a motor vehicle 2, only the final drive 1 and a wheel axle 3 of which are indicated here. The final drive 1 has a drive assembly 4, namely preferably an electric motor. The drive assembly 4 supplies a drive torque via a drive shaft 5, which is mounted rotatably in a motor housing 6 of the drive assembly 4. The drive shaft 5 is in mechanical operative connection with an output shaft 10 via a gear stage 7, which is composed of toothed gears 8 and 9, designed as spur gears. The output shaft 10 is coupled, in turn, preferably via an axle differential 11, to a first axle member 12 and a second axle member 13 of the wheel axle 3.

The final drive 1 has an intermediate shaft 14, which is offset with respect to the drive shaft 5 and is coupled to the drive shaft 5 via an intermediate-shaft gear stage 15. The intermediate-shaft gear stage 15 is preferably composed of toothed gears 16 and 17, which mesh with each other. The toothed gear 16 is hereby arranged on the drive shaft 5 and, in particular, is connected to it rigidly and/or permanently. In contrast, the toothed gear 17 is present on the intermediate shaft 14 and is preferably likewise connected to it rigidly and/or permanently. Via the intermediate shaft 14, the toothed gear 17 and the toothed gear 8 are in this regard in permanent operative connection with each other.

In summary, the drive shaft 5 is operatively connected mechanically via the intermediate shaft 14, which is arranged offset to it, to the gear stage 7 and via the latter to the output shaft 10. It can be seen that the intermediate shaft 14 is present on a first side of a conceptual plane that incorporates the axis of rotation of the drive shaft 5. The embodiment of the final drive 1 with the intermediate shaft 14 makes possible an especially compact design of the final drive 1, because a power electronics unit 18 can be arranged at the front end of the drive assembly 4 and can be electrically connected to it.

The electrical connection is created, for example, by means of plug connectors 19, which are only indicated here. These plug connectors 19 represent connection terminals, which are present at the front end at the drive assembly 4, in particular at a bearing shield of the motor housing 6. The power electronics unit 8 in this regard overlaps, as viewed in the axial direction with respect to the axis of rotation of the drive shaft 5, at least with portions of the drive shaft 5 and the intermediate shaft 14.

The wheel axle 3 illustrated here can be present as a front axle or a rear axle of a two-axle motor vehicle. If the motor vehicle 2 has a plurality of wheel axles 3, then only one of these wheel axles 3, a part of the wheel axles 3, or else all wheel axles 3 can each be associated with a final drive 1 of the described design. The drive shaft 5 of the drive assembly 4 is arranged in such a design at least approximately parallel to the wheel axle 3.

FIG. 2 shows a schematic illustration of a first embodiment of a final drive device 20, which has a first final drive 21 and a second final drive 22. Each of the final drives 21 and 22 is constructed largely similar to the final drive 1. For this reason, the same reference characters are used for the final drives 21 and 22 as for the final drive 1. Reference is made fundamentally to the statements made above.

The difference between the final drives 21 and 22 and the final drive 1 lies in the fact that, on the one hand, the drive assemblies 4 or their drive shafts 5 are at an angle with respect to the wheel axle 3. The drive assemblies 4 or the drive shafts 5 are hereby present essentially in the longitudinal direction of the motor vehicle 2 or in the main travel direction of the motor vehicle 2.

Although the gear stage 7 is additionally composed of toothed gears 8 and 9, the latter are not designed as spur gears, but rather as crown gears. Each final drive 21 and 22 is also equipped with its own output shaft 10, wherein each of the output shafts 10 is linked to one of the axle members 12 and 13 in such a way as to transmit torque. In this regard, by use of the final drive device 20, an individual-wheel drive for the wheel axle 3 is realized.

It can be seen that the two drive assemblies 4 are arranged symmetrically with respect to a plane of symmetry 23 running between them. The intermediate shafts 14 of the two final drives 21 and 22 are each arranged offset with respect to the corresponding drive shaft 5 in the direction facing away from the plane of symmetry 23. By use of such a design of the final drive device 20, a power electronics mounting compartment 24 for the power electronics unit 18 is created between the gear stages 7.

At least portions of this power electronics unit mounting compartment 24 are delimited from the drive assemblies 4 in the axial direction. Accordingly, the connectivity of the power electronics unit 18 to the drive assemblies 4 can occur via the front ends of the motor housing 6 facing the power electronics unit mounting compartment 24. Preferably, the two gear stages 7 are arranged in a common gear housing 25, at and/or in which the output shafts 10 are also mounted.

The power electronics unit mounting compartment 24 can also be present in the gear housing 25. Preferably, it is hereby delimited or separated by means of at least one dividing wall 26—in the exemplary embodiment illustrated here, by two dividing walls 26—from the gearbox mounting compartments 27, with the gear stages 7 and/or the intermediate-shaft gear stages 15 being arranged in the gearbox mounting compartments 27.

It is possible—as illustrated here—to arrange each of the drive assemblies 4 in a separate motor housing 6. In this case, the two motor housings 6 are preferably joined to the gear housing 25 or fastened at it by means of screw connections, for example. Alternatively, it can be provided that the two drive assemblies 4 are present in a common motor housing 6, which is then likewise joined to the gear housing 25 or fastened to it.

A final drive device 20, in which a single gear housing 25 is present, at which the drive assemblies 4 are fastened, is obtained in this case. The gear stages associated with the drive assemblies 4 are arranged in the gear housing 25 and serve for producing the operative connections between the drive shafts 5 and the output shafts 10. Achieved overall is an extremely compact design of the final drive device 20, for which the power electronics units 18 are also arranged in a space-saving manner through their mounting in the gear housing 25.

It can be seen, in addition, that the two final drives 21 and 22, which are a component of the final drive device 20, have numerous identical parts, which, in particular, are also identical to those of the final drive 1 described above. An extremely modular construction made up of numerous identical parts is created in this case, so that the final drive 1 or the final drive device 20 can be employed for numerous drive configurations of the motor vehicle 2. The wheel axle 3 with which the final drive device 20 is associated can be, in turn, a front axle or a rear axle of the motor vehicle. Preferably, such a final drive device 20 is associated with both the front axle and the rear axle.

Based on the alignment of the drive assemblies 4 in the longitudinal direction or main travel direction of the motor vehicle 2, it is possible to achieve any desired scaling of the drive assemblies 4 depending on the power demand of the motor vehicle 2. Thus, for example, it is possible to use a less-powerful embodiment of the final drive device 20 in drive assemblies 4 that have a shorter construction in the longitudinal direction, whereas the drive assemblies 4 can have a longer construction in the longitudinal direction for a more powerful final drive device 20, so that, overall, a modular system is created.

FIG. 3 shows a schematic illustration of a second embodiment of the final drive device 20—again with the first final drive 21 and the second final drive 22. In regard to the final drives 21 and 22, reference is made to the final drive 1. Once again, the same reference characters are used for the final drives 21 and 22 as for the final drive 1. The second embodiment of the final drive device 20 is constructed similarly to the first embodiment. Reference is therefore made to the foregoing statements and only the differences are noted below. These differences lie in the fact that the gear stage 7, in analogy to the final drive 1, has spur gears and not, for instance, crown gears, as is the case for the first embodiment. In contrast, the toothed gears 16 and 17 of the intermediate-shaft gear stages 15 are each designed as crown gears, so that the intermediate-shaft gear stages 15 in this case are present as crown gear stages.

Such a design of the final drive device 20 results in a slightly different form of the power electronics unit mounting compartment 24, which is due essentially to the design of the intermediate-shaft gear stages 15 as crown gear stages.

The invention claimed is:

1. A final drive for a motor vehicle, comprising: a drive assembly having a drive shaft, wherein the drive shaft is coupled via a gear stage to an output shaft of a the final drive, wherein the drive shaft is coupled to the gear stage via an intermediate shaft that is arranged offset with respect to the drive shaft, wherein the intermediate shaft lies on a first side of a conceptual plane incorporating an axis of rotation of the drive shaft, and wherein a power electronics unit is electrically connected to the drive assembly via connection terminals arranged at the front end thereof on a second side, which lies opposite to the first side so that the power electronics unit and the gear stage are arranged in a single housing.

2. The final drive device for a motor vehicle according to claim 1, further comprising:
a first final drive and a second final drive;
a first drive assembly of the first final drive, which has a first drive shaft, and
a second drive assembly of the second final drive, which has a second drive shaft,
wherein the first drive shaft is coupled via the first gear stage to a first output shaft of the final drive device and the second drive shaft is coupled via a second gear stage to a second output shaft of the final drive device,
wherein the first drive assembly and the second drive assembly are arranged symmetrically with respect to a plane of symmetry running between them,
wherein the first drive shaft is coupled to the first gear stage via a first intermediate shaft, which is at an angle with respect to it, skewed with respect to it, and offset with respect to it in the direction facing away from the plane of symmetry, and
the second drive shaft is coupled to the second gear stage via a second intermediate shaft, which is arranged at an angle with respect to it, skewed with respect to it, and offset with respect to it in the direction facing away from the plane of symmetry.

3. The final drive device according to claim 2, wherein the first gear stage and the second gear stage are each designed as a bevel gear stage, so that an axis of rotation of the first output shaft and an axis of rotation of the second output shaft are each at an angle with respect to the plane of symmetry or the first gear stage and the second gear stage are each designed as a spur gear stage.

4. The final drive device according to claim 2, wherein the first gear stage and the second gear stage are arranged in a common gear housing, in which the two output shafts are mounted.

5. The final drive device according to claim 2, wherein the first drive shaft is coupled to the first intermediate shaft via a first intermediate-shaft gear stage and the second drive shaft is coupled to the second intermediate shaft via a second intermediate-shaft gear stage.

6. The final drive device according to claim 5, wherein an intermediate-shaft gear wheel of the respective intermediate-shaft gear stage, which is connected to one of the intermediate shafts in a rotationally-resistant manner, is arranged on one side of a conceptual plane that incorporates the axis of rotation of the respective drive shaft and is arranged parallel to the plane of symmetry.

7. The final drive device according to claim 2, wherein between the first gear stage and the second gear stage, a power electronics unit mounting compartment is formed for the mounting of a power electronics unit for the first drive assembly and the second drive assembly, wherein at least portions of the power electronics unit mounting compartment are delimited by the first drive assembly and the second drive assembly.

8. The final drive device according to claim 7, wherein the power electronics unit mounting compartment is separated from a first gearbox mounting compartment, in which the first gear stage and the first intermediate-shaft gear stage are arranged, and from a second gearbox mounting compartment, in which the second gear stage and the second intermediate-shaft gear stage are arranged, by a dividing wall.

9. The final drive device according to claim 7, wherein a power electronics unit, which is arranged in the power electronics unit mounting compartment, is electrically connected via connection terminals arranged at the front end at the first drive assembly and the second drive assembly.

10. The final drive device according to claim 2, wherein the first drive assembly is arranged in a first motor housing and the second drive assembly is arranged in a second motor housing, wherein the first motor housing and the second motor housing are arranged directly at the gear housing.

* * * * *